(12) United States Patent
Toliver, III (10) Patent No.: US 11,478,690 B1
(45) Date of Patent: Oct. 25, 2022

(54) MULTI-USE GOLF TRAINING TOOL

(71) Applicant: John M. Toliver, III, Marina Del Rey, CA (US)

(72) Inventor: John M. Toliver, III, Marina Del Rey, CA (US)

( * ) Notice: Subject to any disclaimer, the term of this patent is extended or adjusted under 35 U.S.C. 154(b) by 175 days.

(21) Appl. No.: 16/937,053

(22) Filed: Jul. 23, 2020

(51) Int. Cl.
*A63B 69/36* (2006.01)
*F16M 13/00* (2006.01)

(52) U.S. Cl.
CPC ......... *A63B 69/3676* (2013.01); *F16M 13/00* (2013.01); *A63B 2220/806* (2013.01)

(58) Field of Classification Search
CPC .......... A63B 69/3676; A63B 2220/806; A63B 63/00; A63B 71/023; A63B 71/024; F16M 13/00; F16M 11/22; A45F 3/44; E06C 1/14; E06C 1/16
USPC .......................................... 273/343; 396/419
See application file for complete search history.

(56) References Cited

U.S. PATENT DOCUMENTS

| | | | | |
|---|---|---|---|---|
| 2,509,074 A | * | 5/1950 | Reiley | A45F 3/44 248/156 |
| 3,871,481 A | * | 3/1975 | Ballek | E06C 7/084 182/220 |
| 5,454,571 A | * | 10/1995 | Morrison | F41J 1/10 273/407 |
| 6,808,175 B1 | * | 10/2004 | Gleeson | A63B 67/06 473/576 |
| 6,889,982 B1 | * | 5/2005 | Gove | A63B 63/00 273/400 |
| 7,198,273 B1 | * | 4/2007 | Advocate | A63B 43/007 273/343 |
| 7,418,798 B2 | * | 9/2008 | Barrett | A01K 97/10 43/21.2 |
| 7,706,673 B1 | * | 4/2010 | Staudinger | G03B 17/00 396/428 |
| 11,019,912 B2 | * | 6/2021 | Saunders | A45C 3/10 |
| 2005/0051683 A1 | * | 3/2005 | Young | G03B 37/02 248/156 |
| 2006/0091609 A1 | * | 5/2006 | Dovrat | A63B 63/00 273/398 |
| 2006/0125184 A1 | * | 6/2006 | Benson | A63B 67/002 273/343 |
| 2007/0035093 A1 | * | 2/2007 | Fuchs | A63B 67/06 273/343 |
| 2007/0246886 A1 | * | 10/2007 | Hunt | A63B 67/002 273/343 |
| 2008/0093803 A1 | * | 4/2008 | Vallee | A63F 9/02 273/343 |
| 2008/0107412 A1 | * | 5/2008 | Moore | G03B 17/561 396/427 |

(Continued)

FOREIGN PATENT DOCUMENTS

GB 697767 * 9/1953

*Primary Examiner* — Steven B Wong
(74) *Attorney, Agent, or Firm* — Suiter Swantz pc llo (57) ABSTRACT

A multi-use golf training tool which may be used to film a golfer or to be used to read a putting green. When being used to film a golfer, a phone camera is attached to the upper end of the tool and the lower end of the tool is inserted into the ground in a vertical manner. When used to read a putting green, the lower end of the tool is positioned on the ground at an angular manner to provide a ramp which is configured to have a golf ball roll downwardly therefrom onto the putting green.

3 Claims, 8 Drawing Sheets

(56) References Cited

U.S. PATENT DOCUMENTS

| | | | | |
|---|---|---|---|---|
| 2008/0107413 A1* | 5/2008 | Moore | ................. | G03B 17/561 |
| | | | | 396/428 |
| 2010/0120559 A1* | 5/2010 | Biederman | ............ | A63B 67/06 |
| | | | | 473/476 |
| 2010/0155549 A1* | 6/2010 | Robinson | ............... | F16M 11/28 |
| | | | | 396/428 |
| 2016/0342072 A1* | 11/2016 | Sherman | ............... | G03B 17/561 |
| 2020/0306586 A1* | 10/2020 | Cheung | ................. | H04N 7/183 |

* cited by examiner

MULTI-USE GOLF TRAINING TOOL

BACKGROUND OF THE INVENTION

Field of the Invention

This invention relates to a multi-use golf training tool which includes pair of elongated alignment rods or sticks which are spaced-apart and which are connected together. More particularly, this invention relates to a multi-use golf training tool which may be used to support a mobile phone camera phone or other camera to record the alignment of a golfer and/or the swing of the golfer. Even more particularly, this invention may be used to assist a golfer to "read" a putting green by rolling a golf ball downwardly from the invention onto the green.

Description of the Related Art

Golfers have long used elongated alignment rods or sticks which are placed on the ground, during practice, to assist the golfer to properly align themselves during the stance, backswing and downswing. In recent years, mobile phone cameras or other cameras have been mounted on an upright alignment rod near the golfer to visually record the golfer's swing which may be forwarded to a swing coach or golf professional for analysis. The use of a single alignment rod or stick to support the mobile phone doesn't satisfactorily support the camera phone in a stable non-moving position.

Another golf training device is the device of Eyeline Golf which is placed on the ground on the green wherein a golf ball is rolled off the device onto the green to demonstrate the combination of speed and line.

Heretofore, no one has provided a golf training tool which may be used to support a camera therein and which may be used to practice speed and line of practice putts.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A multi-use golf training tool is provided which may be used to support a mobile phone camera or other camera thereon and which may also be used to learn the speed and line of practice putts. The tool of this invention includes elongated first and second alignment rods which are spaced-apart. A plurality of spaced-apart camera supports are secured to the first and second rods in a spaced-apart manner throughout the upper portion thereof. The lower ends of the first and second rods are tapered with a blunt tip so that the lower ends of the first and second rods may be inserted into the ground whereby the first and second rods are vertically disposed. The tool may be positioned in an upright position adjacent a flagstick or positioned rearwardly of the golfer. The length of the rods is such that a phone camera thereon will be positioned at an ideal height to properly record the golfer's swing, stance, etc. The lower ends of the first and second rods may also be positioned on the ground at an angle so that a golf ball placed therein will be supported therein and will roll downwardly therefrom onto a putting green.

The golf tool of this invention may also be placed on the ground to serve as an alignment tool.

It is therefore a principal object of the invention to provide a multi-use golf training tool.

A further object of the invention is to provide a golf training tool which may be used to support a camera thereon in a stable manner.

Yet another object of the invention is to provide a golf training tool which may be used to practice length and line of putts.

Still another object of the invention is to provide a golf training tool which may be used for alignment purposes.

Still another object of the invention is to provide a multi-use golf training tool which may be placed in a golf bag.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The multi-use golf training tool of this invention is designated by the reference numeral 10. Tool 10 includes a first elongated rod 12 having an upper end 14 and a tapered lower end 16 with a blunt tip 18. Tool 10 includes a plurality of spaced-apart tapered markers 19 affixed thereto which are spaced-apart 30 mm. Tool 10 also includes a second elongated rod 20 having an upper end 22 and a tapered lower end 24 with a blunt tip 26. A rubber cap 28 is mounted on the upper end 14 of rod 12 and a rubber cap 30 is mounted on the upper end of rod 20. Each of the rods 12 and 20 preferably have a diameter of 8 mm and preferably have a length of 122 centimeters. Preferably, six or more round fiberglass supports 32, having a diameter of 8 mm and a length of 25 mm, are secured to the rods 12 and 20 and extend therebetween at the upper ends thereof. The uppermost round fiberglass support 32 is preferably positioned 20 mm below the upper ends 14 and 22 of rods 12 and 20 respectively. The other supports 32 are positioned 55 mm apart. The ends of the support 32 are curved to fit flush to the rods 12 and 20 and are secured thereto with a centering pin and glue or other adhesive.

Figure 1:
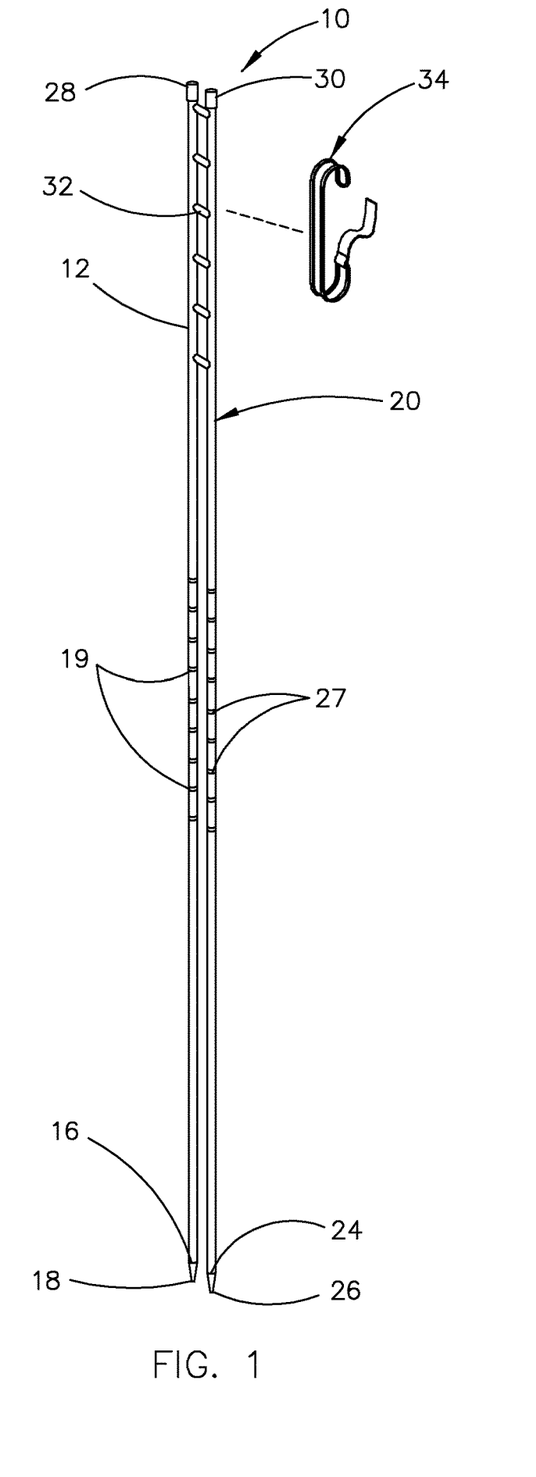
FIG. 1 is an exploded perspective view illustrating a camera or mobile phone camera support and the tool of this invention.
Figure 2:
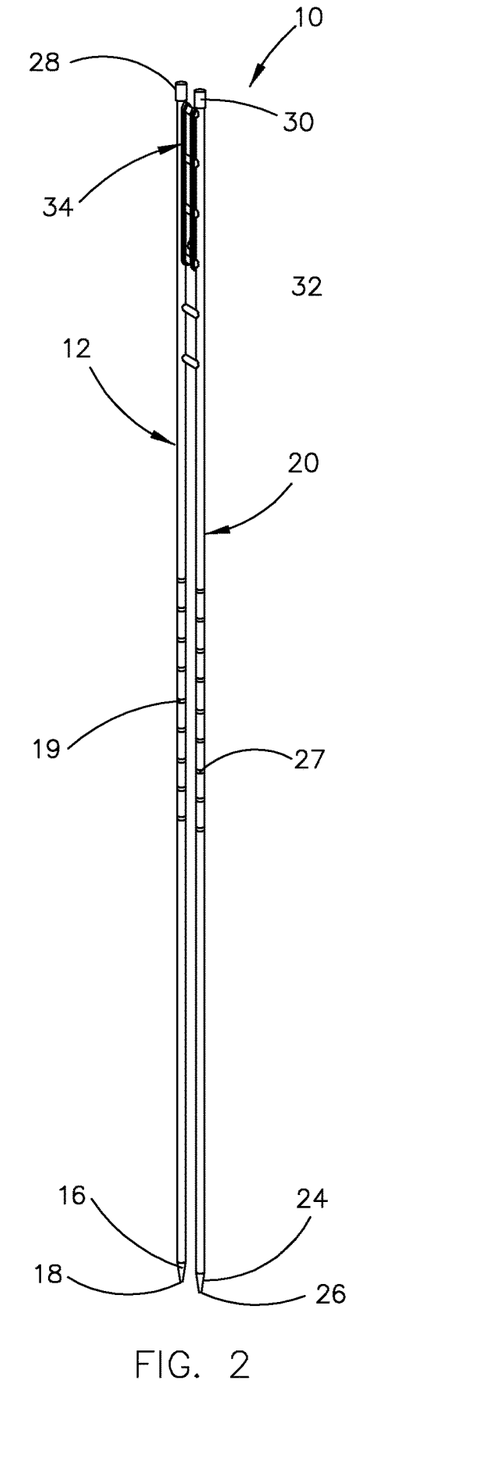
FIG. 2 is a perspective view illustrating the camera or mobile phone camera support secured to the tool of this invention.
Figure 3:
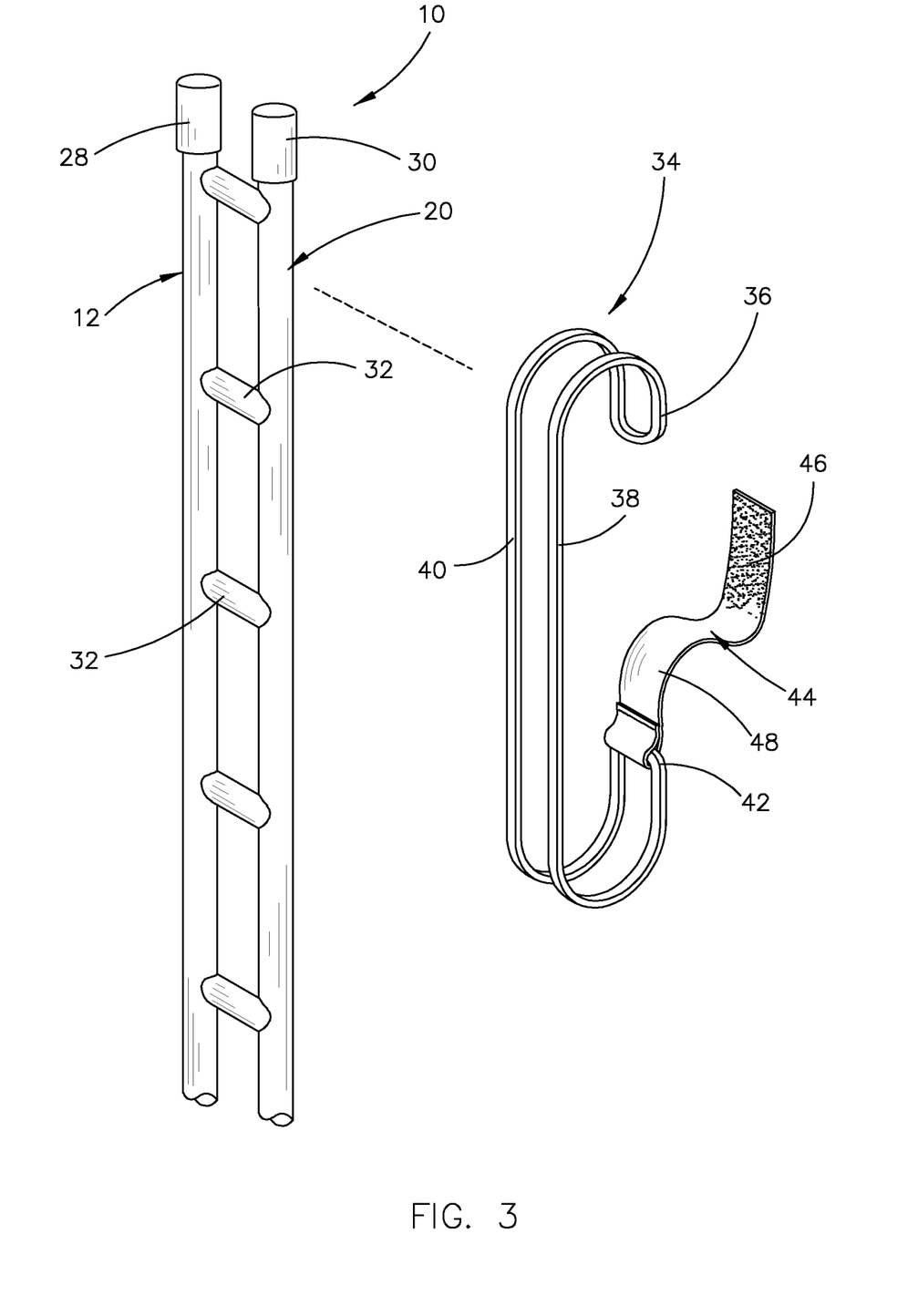
FIG. 3 is a partial exploded perspective view of the tool of this invention and the camera or mobile phone camera support.

The numeral 34 refers to an attachment strap which is designed to secure a camera or mobile phone camera onto the upper end of the tool 10. Strap 34 is comprised of a flexible and stretchable material. Strap 34 includes a U-shaped end 36 having strap members 38 and 40 extending upwardly and downwardly therefrom and which terminate in a U-shaped end 42. A flexible strap member 44 has one end secured to U-shaped portion 42 and has Velcro hook members 46 at one side thereof at the free end thereof which are adapted to be secured to the loop fasteners 48 on strap 44.

The U-shaped end 36 is extended over and around the uppermost support 32 with the strap members 38 and 40 being positioned at one side of the tool 10 as shown in the drawings. The U-shaped end 42 of attachment strap 34 is then extended around one of the supports 32 so as to extend upwardly at the other side of tool 10. The strap 44 is then extended through the U-shaped end 36 of strap 32 and thence downwardly therefrom. The hook members 46 are then fastened to the loop fasteners 48 to secure the strap 34 to the tool 10 as seen in the drawings.

Figure 7:
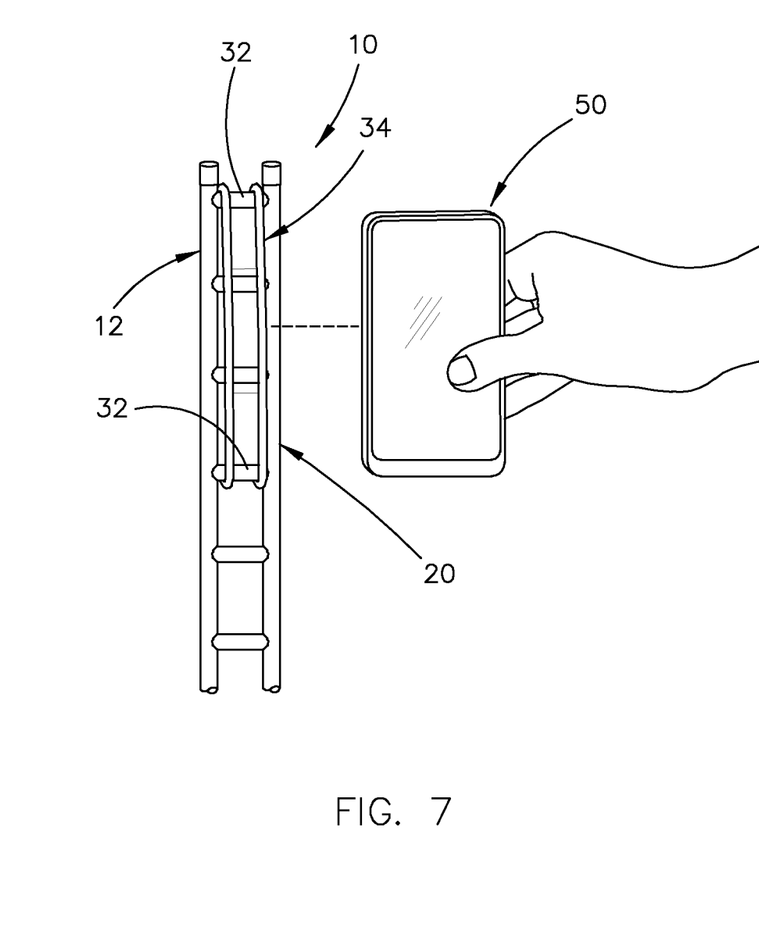
FIG. 7 is a partial perspective view illustrating the manner in which a camera or mobile phone camera is being mounted on the tool of this invention.
Figure 8:
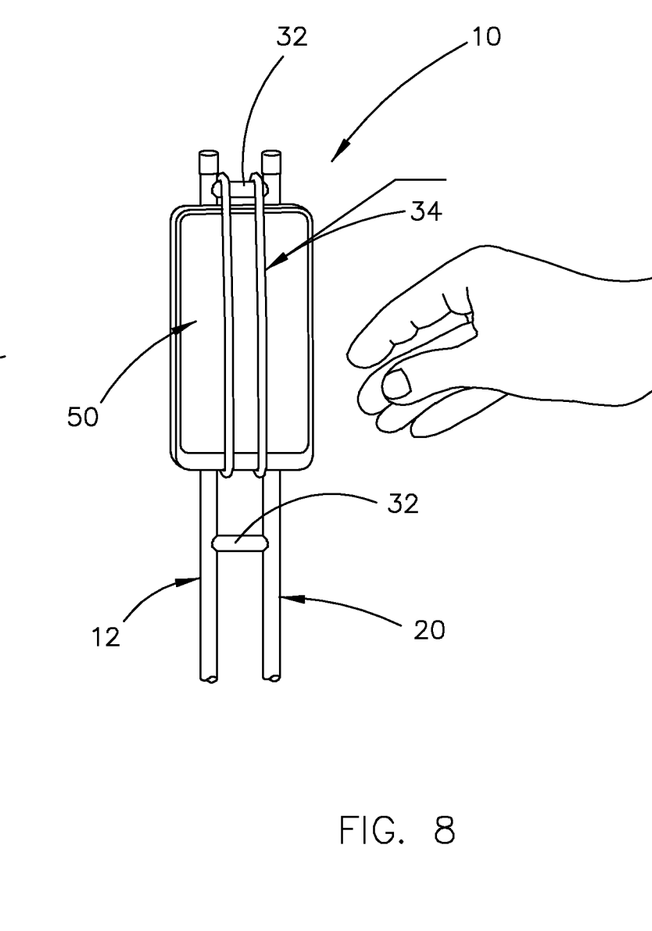
FIG. 8 is a partial perspective view of the tool of this invention having a camera or I-phone mounted on the upper end thereof.

The numeral 50 refers to a mobile phone camera or other type of camera which is secured to the upper end of tool 10 by slipping the camera 50 between the flexible and stretchable strap members 38 and 40 and the tool 10. Alternatively, the mobile phone camera 50 could be positioned at the upper end of tool 10 with the strap 34 then being secured to the tool 10.

In the drawings, the numeral 52 refers to a golfer while the numeral 54 refers to a flag stick positioned in a hole or cup 55 in a golf green 56.

Figure 4:
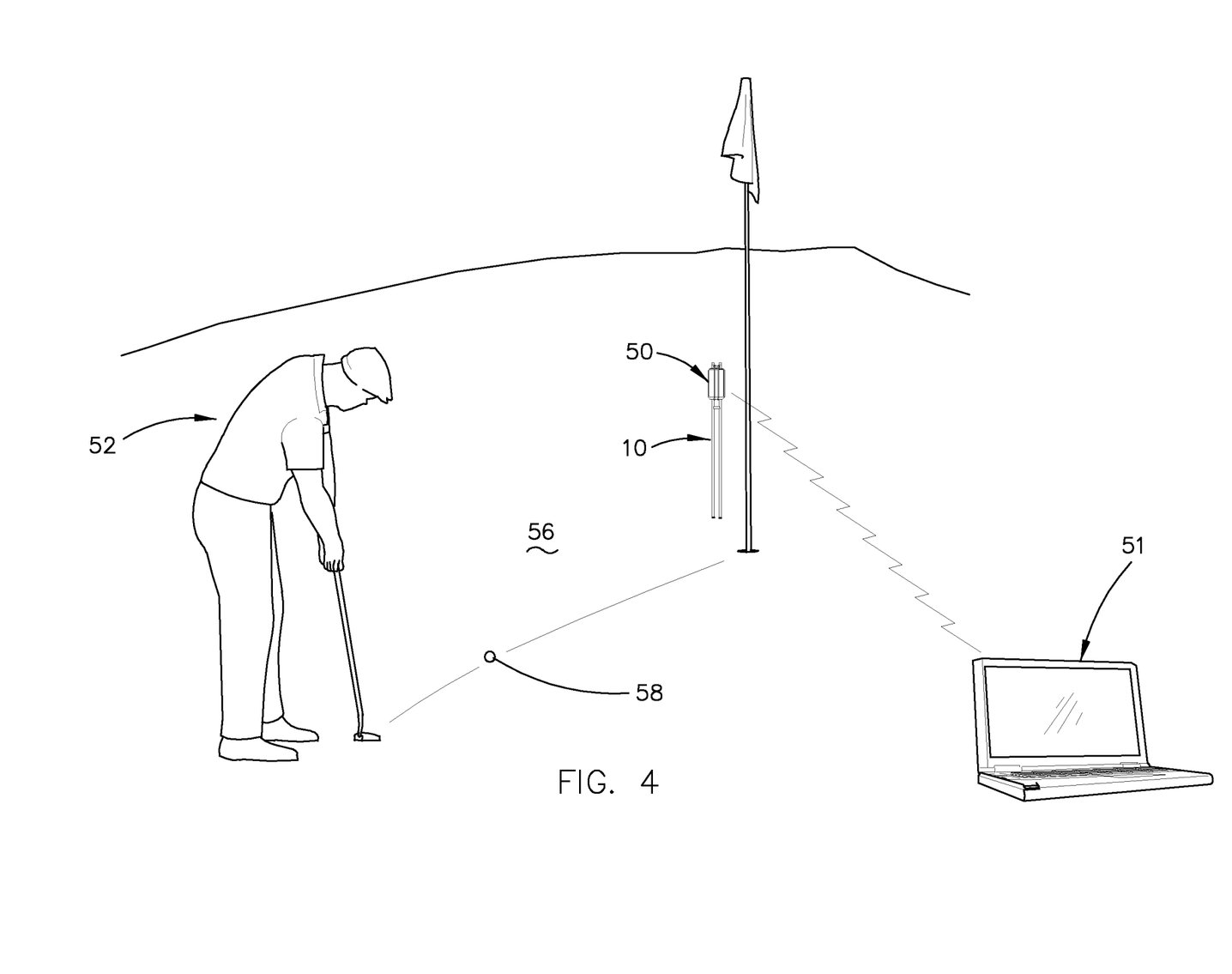
FIG. 4 is a perspective view illustrating a golfer using the tool of this invention while putting.
Figure 4A:
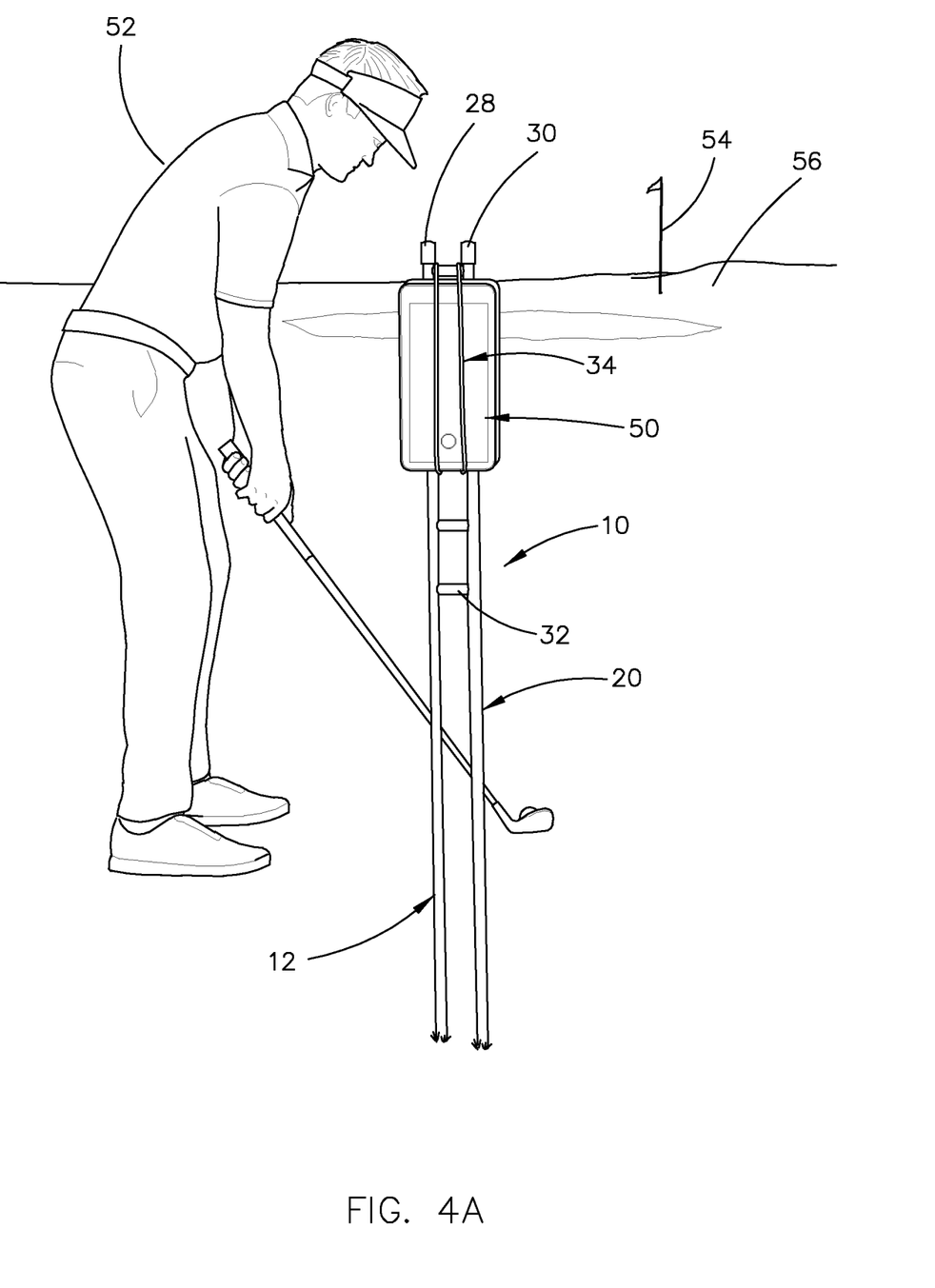
FIG. 4A is a perspective view illustrating the tool of this invention being positioned rearwardly of a golfer.
Figure 5:
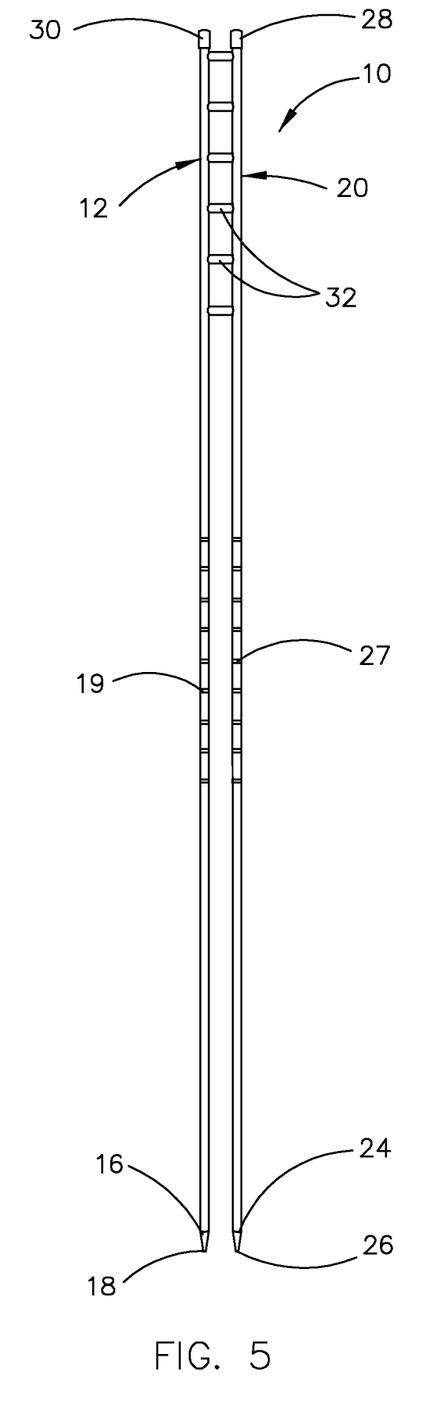
FIG. 5 is a front view of the tool of this invention.
Figure 6:
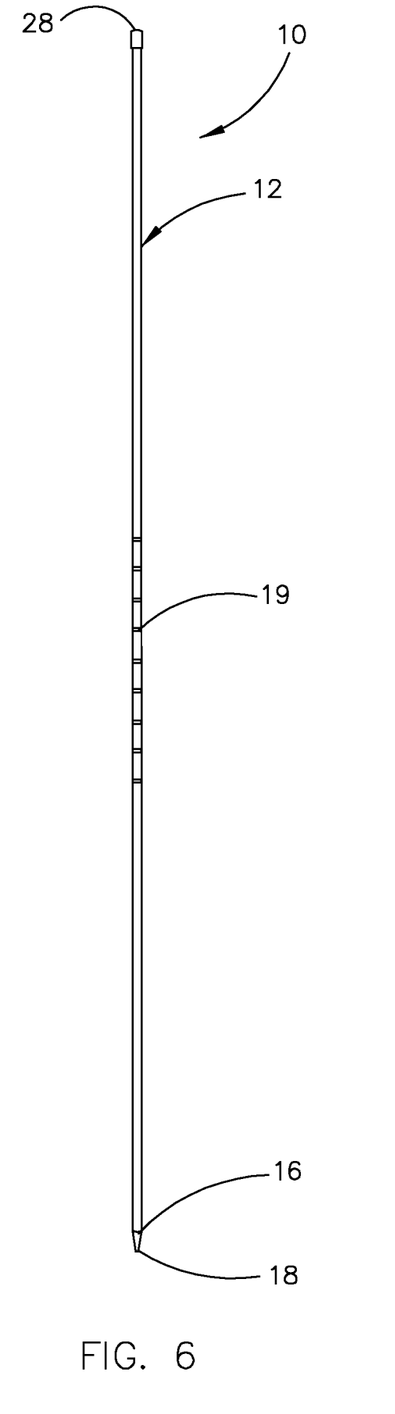
FIG. 6 is a side view of the tool of this invention.

The tool 10 may be placed in a golf bag since it is approximately 48 inches long and adds very little weight to the golf bag. The tool 10 is easily spiked into the ground as seen in FIGS. 4 and 4A to hold a phone 50 at the ideal height to film the golf swing of a golfer 52. The dual-prong design of the tool 10 provides enhanced stability when spiked into the ground to hold the golfer's phone in place and provide stable and reliable recording. The phone 50 may relay the filming to a computer 51.

The flexible and stretchable strap 34 enables the golfer to secure any size phone to the supports 32. As seen in FIG. 4, the tool 10 may be placed near the flagstick or positioned behind the golfer 52 as seen in FIG. 4A.

Figure 9:
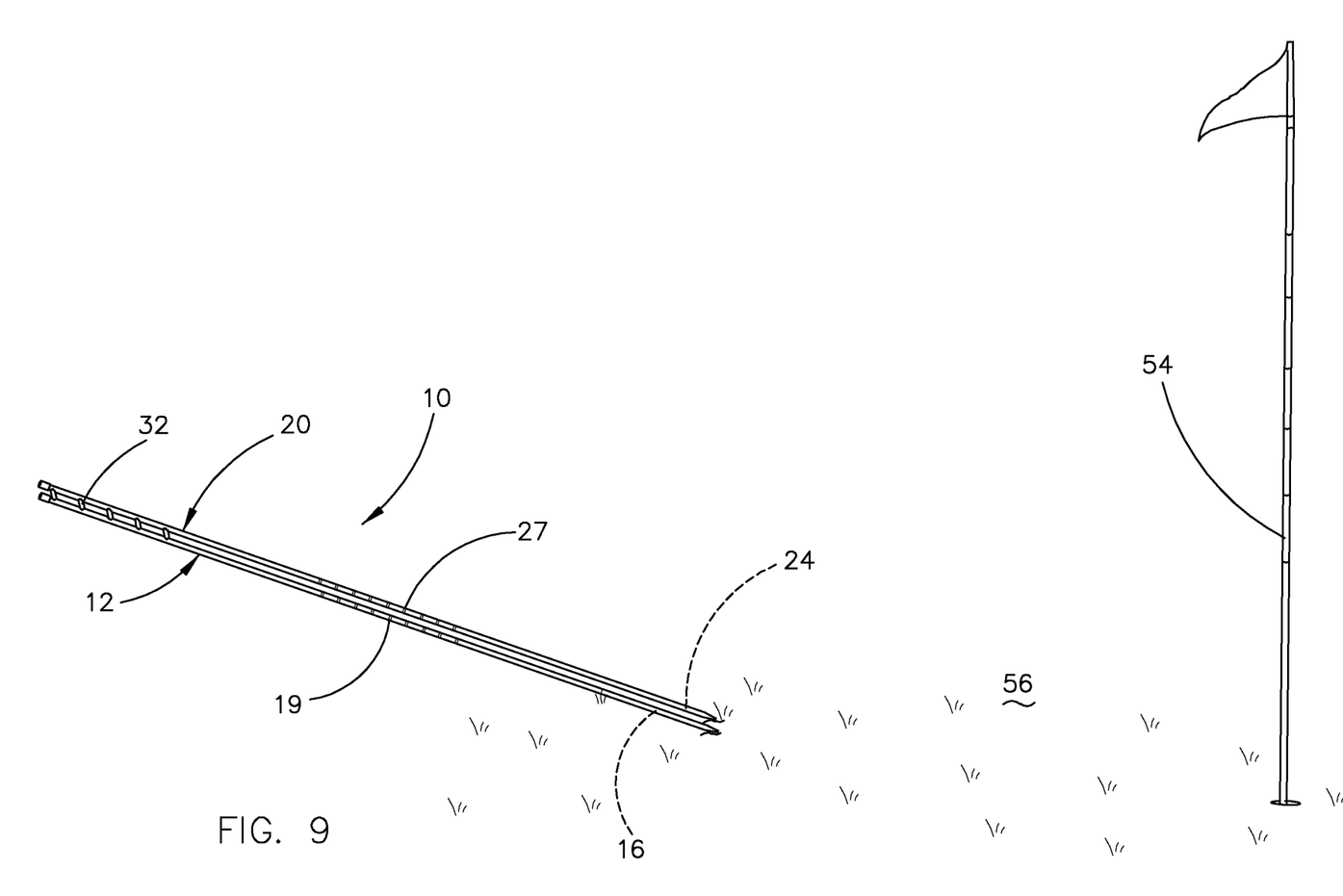
FIG. 9 is a perspective view illustrating the tool of this invention being angularly positioned on the ground near a golf green.
Figure 10:
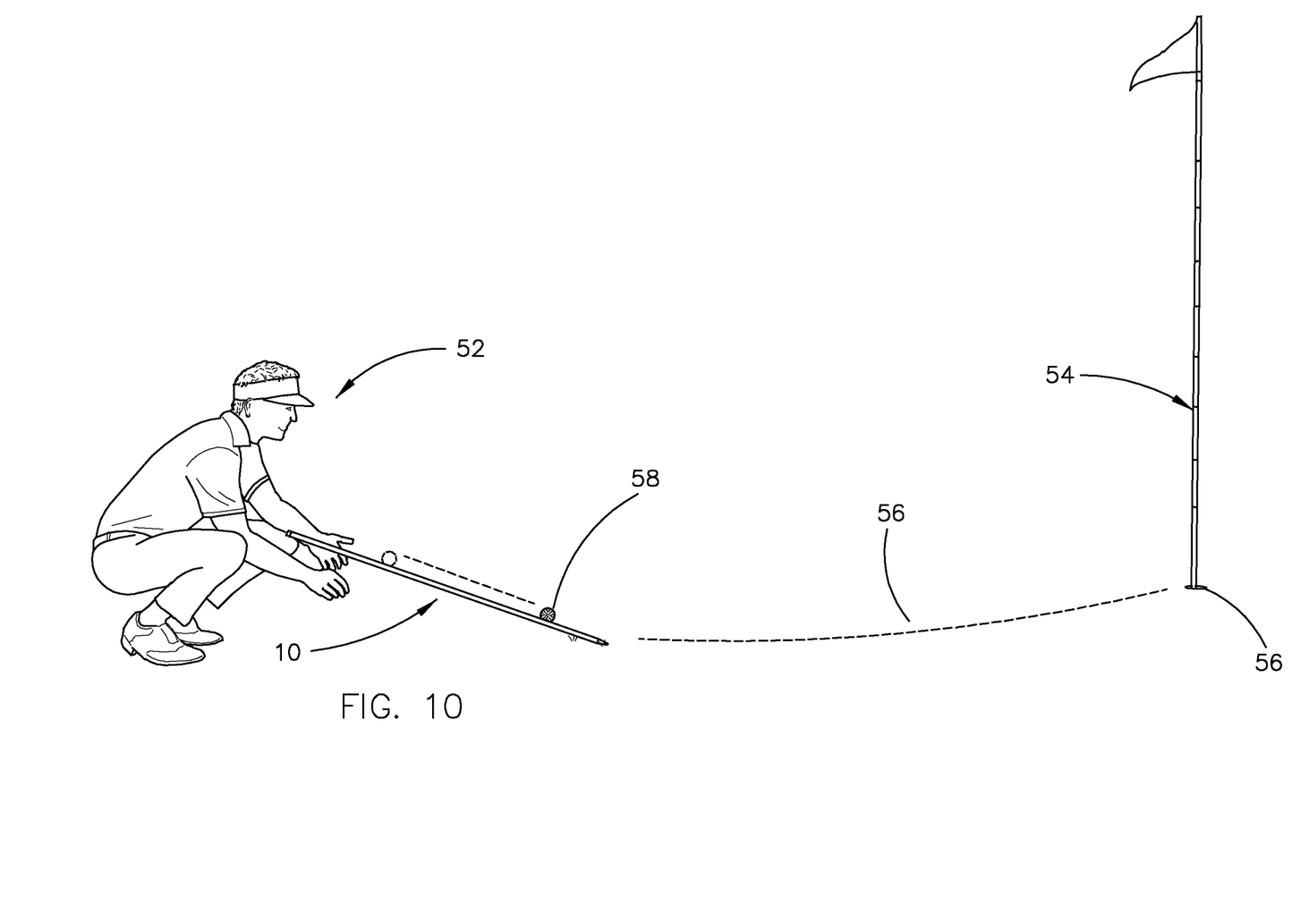
FIG. 10 is a perspective view illustrating a golfer using the tool of this invention at the edge of a golf green.

The tool 10 doubles as an innovated and easy-to-use putting tool as seen in FIGS. 9 and 10. In FIGS. 9 and 10, the lower ends of the rods 12 and 20 are positioned on the ground and are not inserted into the ground. The golfer may test any putt under 15 feet by orienting the tool 10 like a ramp as seen in FIGS. 9 and 10. A golf ball 58 may be rolled down the rods 12 and 20 to the putting surface 56. The tapered lower ends 16 and 24 of rods 12 and 20 respectively allows the ball to roll off the tool 10 and onto the green exactly how a perfect putt would roll. The parallel design of the rods 12 and 20 and their calculated width, allow them to cradle the ball as it rolls down the ramp providing a perfectly straight, end-over-end roll every time. The ability of the golfer to aim the tool and adjust the height of the ramp provides a valuable putting tool. The tapered markers 19 and 27 on the rods 12 and 20 respectively enable the golfer to easily select different lengths of the putt.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:

a golf training tool comprising:

(a) an elongated first rod having an upper end and a lower end;

(b) an elongated second rod having an upper end and a lower end;

(c) said first and second rods being parallel to one another and being spaced-apart;

(d) a plurality of spaced-apart camera supports secured to said first and second rods at said upper ends of said first and second rods;

(e) said lower ends of said first and second rods being configured to be extended downwardly into the ground;

a camera positioned at said upper ends of said first and second rods; and a flexible attachment strap extending around said camera and said camera supports to selectively secure said camera to said upper ends of said first and second rods.

2. The golf training tool of claim 1 wherein said first and second rods are spaced-apart approximately 4 centimeters.

3. The golf training tool of claim 1 wherein a camera attachment strap is selectively removably secured to said spaced-apart supports.

* * * * *